United States Patent

[11] 3,626,069

[72] Inventors Walther H. Ott
   Westfield;
   George Olson, Fanwood, both of N.J.
[21] Appl. No. 102,970
[22] Filed Dec. 30, 1970
[45] Patented Dec. 7, 1971
[73] Assignee Merck & Co., Inc.
   Rahway, N.J.
   Continuation-in-part of application Ser. No. 768,885, Oct. 18, 1968, now abandoned. This application Dec. 30, 1970, Ser. No. 102,970

[54] GROWTH PROMOTION
   4 Claims, No Drawings
[52] U.S. Cl. .................................................. 424/273,
[51] Int. Cl. .................................................. A61k 27/00
[50] Field of Search .................................. 424/273

[56] References Cited
   UNITED STATES PATENTS
| | | | |
|---|---|---|---|
| 3,299,090 | 1/1967 | Hoff .............................. | 423/273 |
| 3,450,710 | 6/1969 | Verdi ............................ | 260/309 |
| 3,459,764 | 8/1969 | Kollonitsch ................. | 260/309 |

OTHER REFERENCES

The Merck Veterinary Manual (1955), Merck & Co. Inc., Rahway, N.J. (USA), page 789.

Primary Examiner—Albert T. Meyers
Assistant Examiner—Frederick E. Waddell
Attorneys—I. Louis Wolk, J. Jerome Behan and Hesna J. Pfeiffer ABSTRACT: Growth promotion in animals is achieved by administration of 1-methyl-5-nitroimidazol-2-methyl carbamate in feed and/or water.

GROWTH PROMOTION

CROSS REFERENCE TO RELATED APPLICATION

This application is a continuation-in-part application of U.S. Ser. No. 768,885 filed Oct. 18, 1968, now abandoned.

This invention relates to a composition and method for treating animals. More particularly, this invention relates to the promotion of growth in animals. Specifically, this invention is directed to novel growth-promoting or growth-accelerating compositions containing 1-methyl-5-nitroimidazol-2-ylmethyl carbamate and the method of initiating an improved growth response by administration of same to animals, particularly poultry and swine.

It is known to accelerate the growth rate of animals by administration of certain classes of substances. One such class is antibiotics. Another class of such substances is surfactants. Still another class is estrogens. The administration of each of these classes of substances has disadvantages, however, which have prevented their universal acceptance. Thus, it is believed that antibiotics and surfactants, while effective under certain conditions, principally act to suppress diseases and do not elicit a true growth response. Although the growth promoting advantages of estrogens are well known, their use presents certain inherent difficulties and hazards. Thus, estrogens frequently downgrade the animal to which they are administered. Another disadvantage is that some of the estrogenic material may remain in the edible portions of the animal and could presumably produce an adverse effect on an individual when consumed. Further, the substances known in the art have principally been administered by injection or implantation procedures which are both costly and time-consuming.

It has now been found that the disadvantages of the prior art substances and methods are overcome, and that true growth promotion is achieved, by orally administering 1-methyl-5-nitroimidazol-2-ylmethyl carbamate to animals in conjunction with their normal feed or drinking water.

Accordingly, an object of this invention is to provide an improved feed composition for the promotion of growth in animals which contains 1-methyl-5-nitroimidazol-2-ylmethyl carbamate.

Another object of this invention is to provide a new composition for promoting the growth of animals which comprises water containing 1-methyl-5-nitroimidazol-2-ylmethyl carbamate.

A further object of this invention is to provide a method for increasing the feed efficiency of an animal feed-stuff by incorporating therein 1-methyl-5-nitroimidazol-2-ylmethyl carbamate.

Another object of this invention is to provide a method for accelerating animal growth.

The objects of this invention are accomplished, as stated above, by orally administering 1-methyl-5-nitroimidazol-2-ylmethyl carbamate to animals as an adjunct to their normal feed and/or drinking water.

The effectiveness of 1-methyl-5-nitroimidazol-2-ylmethyl carbamate in the control of certain protozoal diseases in turkeys is known. Unexpectedly, it has now been found that 1-methyl-5-nitroimidazol-2-ylmethyl carbamate effects a remarkable growth promoting response in animals, particularly poultry and swine, when administered within clearly defined concentrations in the animal feed and/or water. Injection and/or implantation is unnecessary and the animals orally ingest the 1-methyl-5-nitroimidazol-2-ylmethyl carbamate free choice with their feed.

The 1-methyl-5-nitroimidazol-2-ylmethyl carbamate is conveniently incorporated directly in the animal feed and/or water. Any suitable method for dispersing the material in the feed can be used. The amount of 1-methyl-5-nitroimidazol-2-ylmethyl carbamate added to the animal feed and/or water may be varied in order to obtain the maximum benefits. Ordinarily, a concentration of from about 0.0015 percent to about 0.03 percent in the animal feed results in accelerated animal growth. Preferably, the animal feed contains from about 0.003 percent to about 0.013 percent 1-methyl-5-nitroimidazol-2-ylmethyl carbamate in order to obtain optimum growth under desirable conditions. When added to water, the concentration of 1-methyl-5-nitroimidazol-2-ylmethyl carbamate will ordinarily be one-half the ordinary feed concentration; i.e. from about 0.00075 percent to about 0.015 percent, preferably 0.0015 percent to about 0.0065 percent, in order to administer an equivalent amount of the growth promotant to the animal. Thus, an animal will normally ingest twice the unit volume of water as it will feed. Accordingly a concentration of 0.006 percent in feed is equivalent to a concentration of 0.003 percent in water or a combined concentration of 0.0015 percent in water plus 0.003 percent in feed.

Feedstuffs and/or water supplemented with 1-methyl-5-nitroimidazol-2-ylmethyl carbamate are particularly suitable for the commercial growing of poultry and swine. By utilizing such supplemental diets, it is not only possible to greatly accelerate the growth of the poultry and swine but the feed efficiency (i.e. the number of pounds of feed needed to produce a 1 pound gain in weight) is greatly increased, resulting in greater economic benefits.

The following examples illustrate specific embodiments of this invention and are not to be considered a limitation thereof.

EXAMPLE 1

This example illustrates the comparative growth of turkeys infected with histomoniasis which are fed a basal ration containing varying concentrations of 1-methyl-5-nitroimidazol-2-ylmethyl carbamate, as against a control group of turkeys infected with histomoniasis which are fed a basal ration only and a control group of noninfected turkeys which are fed a basal ration only.

White turkeys 2 to 3 weeks of age and of both sexes are brooded in electrically heated, wire-floored brooders in isolation areas. Feed and water are provided without restriction. A commercial nonmedicated turkey starter ration is used as the basal ration. It has the following ingredients:

TURKEY BASAL RATION

| | |
|---|---|
| Meat and bone meal | Choline chloride |
| Fish meal | Niacin |
| Poultry byproduct meal | Folic acid |
| Dehulled soybean meal | Animal Fat |
| Corn gluten meal | Menadione sodium bisulfite |
| Dehydrated alfalfa meal | Vitamin E |
| Pulverized oats | Vitamin A palmitate |
| Ground corn | Ethoxyquin (preservative) |
| wheat middlings | D-activated animal sterol |
| Brewer's dried yeast | Calcium carbonate |
| Dried corn and whey fermentation solubles | Calcium iodate |
| | Zinc oxide |
| Dried extracted streptomyces fermentation residue | Cobalt carbonate |
| | Defluorinated phosphate |
| Methionine hydroxy analogue calcium | Salt |
| | Manganous oxide |
| Calcium pantothenate | Copper hydroxide |

The medicated feed is prepared by adding appropriate amounts of 1-methyl-5-nitroimidazol-2-ylmethyl carbamate to the basal ration to provide graded concentrations in the feed. The feed id uniformly blended by thorough mixing just prior to use. All groups of the experimental turkeys are housed in identical brooders in rooms with uniform temperature and light control. Each brooder contains 20 pens containing three to five turkeys each.

All of the turkeys (with the exception of the noninfected control groups) are infected with histomoniasis as follows:

Stock cultures of Histomonas meleagridis (initially obtained from cecal walls of infected birds) are grown with a small amount of sterile rice starch overlaid with a modified Balamuth and Sandza serum medium (Balamuth, W. and Sandza, J. G., "Single standardized culture medium for physiological studies on E.histoyltica." Proc. Soc. Exp. Biol. & Med. 57:161-163, 1944). Transfers are made into fresh medium three times weekly. The turkeys are infected by intercloacal inoculation with 48-hour cultures adjusted to contain the desired number of organisms. On the third day after inoculation, the birds are randomly placed in the cages and weighed. At the same time, feed and water is provided without restriction.

The growth promotion activity of 1-methyl-5-nitroimidazol-2-ylmethyl carbamate is evaluated on the basis of the observations and records of growth of the turkeys. The percent weight gain is calculated for each pen of birds as the percent increase of the terminal mean weight over the initial mean weight. The percent relative weight gain for each pen is then calculated by comparing the percent weight gain for the pen with the average percent weight gain of the noninfected nonmedicated control groups taken as 100 percent. The results of 11 tests are summarized in Table 1, below:

TABLE 1

Summary of Growth Response of Turkeys Fed Graded Feed Concentrations of 1-Methyl-5-nitroimidazol-2-ylmethyl carbamate Beginning 3 Days after Inoculation with Histomonads

| Group | 1-methyl-5-nitroimidazol-2-ylmethyl carbamate, percent | Number of Tests | Number of Cages | Average relative weight gain, percent |
|---|---|---|---|---|
| A | None (infected controls) | 11 | 74 | 62 |
| B | 0.0015 | 7 | 18 | 101 |
| C | 0.003 | 8 | 20 | 109 |
| D | 0.006 | 9 | 26 | 111 |
| E | 0.013 | 9 | 18 | 126 |
| F | None (non-infected controls). | 11 | 21 | 100 |

As shown in table 1, the data on relative weight gain show that the histomonad infection caused a significant depression in the infected, nonmedicated control birds (group A). This significant depression, however, is completely prevented by dietary medications of 0.0015 percent or more 1-methyl-5-nitroimidazol-2-ylmethyl carbamate. Remarkably, however, the growth of the infected turkeys fed 0.003 percent to 0.013 percent 1-methyl-5-nitroimidazol-2-ylmethyl carbamate (groups C-E) averaged 9 percent to 26 percent greater than the growth of the corresponding nonmedicated, noninfected controls (group F) over the same period of time. This remarkable increase in growth represents a true growth promotion response to 1-methyl-5-nitroimidazol-2-ylmethyl carbamate over and above the maintenance of "normal" weight gains through protection against the histomonad infection.

EXAMPLE 2

This example illustrates the comparative growth of turkeys having no exposure to histomoniasis when fed the basal ration only (feed content shown in example 1) as against a control group of turkeys having no exposure to histomoniasis which are fed the same basal ration containing from 0.003 percent to 0.03 percent 1-methyl-5-nitroimidazol-2-ylmethyl carbamate. The tests, which are summarized in table 2, are conducted in animal rooms in a one-story masonry building where facilities and procedures are designed to minimize any introduction of infectious diseases into the building or into the animal quarters. The floor and roof of the building are of concrete slab construction and the walls and partitions are of cinder block. Inside surfaces of walls and ceilings are coated with high-gloss waterproof paint, and floors are coated with a nonskid, waterproof paint. Prior to introduction of animals into a room, the room and all equipment in it are thoroughly cleaned and washed with a large amount of hot water under pressure from a hose. Under these conditions of operation for more than 15 years, bacterial or viral disease has not been recognized clinically in the poultry in this building.

For these tests, day-old Beltsville (small white) or Wrolstad turkeys are obtained from commercial hatcheries and reared in electrically heated, metal, wire-floored battery brooders in temperature-controlled animal rooms in the building described above. Water and feed are supplied without restriction. For each set of experiments initiated at one time, at least 50 percent more turkeys than are required of the same breed are fed basal ration for 1 to 5 days and then individually weighed. Turkeys in the middle two-thirds of the weight distribution are then divided into groups of either four or five turkeys equally balanced according to individual weights. All groups of turkeys in each experiment are fed experimental diets made from one blended lot of base ration. The groups of turkeys and the experimental diets are separately assigned at random to the pen locations for the experiment. One to three of the groups of turkeys in each experiment are fed the nonmedicated basal ration to serve as normal growth controls.

The experimental diets are fed to the turkeys from 2-6 days to 2-4 weeks of age, and the effect of the diet supplement is evaluated in terms of relative weight gain of each group calculated as a percentage of the average weight gain of the corresponding control birds (as 100 percent).

The results of these tests, conducted with turkeys under conditions of freedom from exposure to histomoniasis or other diseases, are summarized in table 2, below.

TABLE 2

Effect of 1-Methyl-5-nitroimidazol-2-ylmethyl carbamate on Growth of Turkeys from one-half to 4 Weeks of Age

| Group | 1-Methyl-5-nitroimidazol-2-ylmethyl Carbamate % | Weight Gain |
|---|---|---|
| 1 | None | 393.0g. |
| 2 | 0.003 | +3.2% |
| 3 | 0.006 | +1.0% |
| 4 | 0.012 | +1.9% |
| 5 | 0.015 | +1.6% |
| 6 | 0.02 | +4.2% |
| 7 | 0.03 | +0.6% |

It is observed from the data on table 2, that the average growth response for the birds fed at each level of concentration is positive. The individual group averages from +1.0 percent to +4.2 percent increased weight gain over that of the controls. More important, however, the overall average growth improvement for all birds receiving 0.003 percent to 0.03 percent 1-methyl-5-nitroimidazol-2-ylmethyl carbamate is +2.2 percent. Thus, the data conclusively show that 1-methyl-5-nitroimidazol-2-ylmethyl carbamate is an effective growth promotant, since the results are obtained in the absence of disease.

EXAMPLE 3

This example illustrates the effect of feeding swine a basal ration containing 0.006 percent 1-methyl-5-nitroimidazol-2-ylmethyl carbamate as compared to a control group of swine fed on basal ration only. All animals, both control and the groups fed the carbamate drug, were clinically healthy, i.e., exhibited no clinical manifestations of disease. No effort was made to provide a sterile environment for either group; on the other hand, the pens were cleaned before the experiment and normal, healthy animals were used for the experiments. At no time during the time of the experiments was any clinical symptom of disease observed in the animals.

The pigs used in the test are at an average age of 4 weeks. The animals are randomly assigned by descending order of weight within a litter. The swine are individually weighed each 28 days and group weighed at an average of 75 pounds. The trial is terminated at 112 days. The basal ration has the following composition:

SWINE BASAL RATION

| | |
|---|---|
| Corn meal | Zinc oxide |
| Dehydrated alfalfa meal | Copper oxide |
| Wheat middlings | Iron carbonate |
| Dried whey product | Calcium iodate |
| Soybean meal | D-activated animal sterol |
| Meat and bone meal | Riboflavin supplement |
| Calcium carbonate | Vitamin $B_{12}$ supplement |
| Salt | Niacin |
| Manganous oxide | Choline chloride |
| Calcium pantothenate | Vitamin A supplement (palmitate) |

A summary of the results obtained are set forth in table 3, below.

TABLE 3.—EFFECT OF 0.006% 1-METHYL-5-NITROIMIDAZOL-2-YLMETHYL CARBAMATE ON GROWTH OF SWINE

| Period (days) | 112 | 112 | 112 | 112 | 140 | 140 | 140 | 140 |
|---|---|---|---|---|---|---|---|---|
| Test | 1 | 1 | 2 | 2 | 3 | 3 | 4 | 4 |
| Drug | No | Yes | No | Yes | No | Yes | No | Yes |
| Number animals | 5 | 5 | 5 | 5 | 5 | 5 | 5 | 5 |
| Feed efficiency | 3.81 | 3.70 | 3.80 | 3.33 | 3.93 | 3.72 | 3.72 | 3.48 |
| Average daily gain | 0.76 | 0.89 | 0.54 | 0.92 | 1.14 | 1.33 | 0.99 | 1.20 |

As shown in Table 3, the swine which receive 0.006 percent 1-methyl-5-nitroimidazol-2-ylmethyl carbamate as a feed supplement show an extraordinary increase in average daily gain as compared to the control groups. By calculation, it is seen that the overall average daily gain of the swine receiving the supplement is 0.23 pound (21 percent) greater than the control groups. This data shows that the drug is an effective growth promotant, since the results are obtained in absence of disease.

It is also seen that feed efficiency (i.e. pounds of feed utilized/1-pound gain in weight) is increased when supplemented by 1methyl-5-nitroimidazol-2-ylmethyl carbamate. Thus, an overall averaging of the feed efficiency data shows that the control groups require 3.82 pounds of feed to produce a gain of 1-pound of body weight while the treated groups require 3.56 pounds of feed to produce a 1-pound gain in weight. Accordingly, it takes an average of 0.26 pounds (7 percent) less of the supplemented feed to produce a 1-pound increase in animal weight.

Duplication of the above tests, at levels of 1-methyl-5-nitroimidazol-2-ylmethyl carbamate of 0.003 percent and 0.012 percent, shows increases of 7 percent and 3 percent, respectively, in average daily gain as compared to the control groups.

As stated above, the benefits of this invention are also realized by administering 1-methyl-5-nitroimidazol-2-ylmethyl carbamate in animal drinking water or in the feed and drinking water. Of course, when administering the drug in the drinking water or in the feed and drinking water, the dosage levels are adjusted so that the total daily intake is equivalent to from 0.0015 percent to about 0.03 percent in the animal feed.

Obviously, many modifications and variations of the present invention are possible in the light of the above teachings. It is therefore to be understood that, within the scope of the appended claims, the invention may be practiced otherwise than as specifically described.

What is claimed is:

1. A method for promoting the growth of disease-free poultry and swine which comprises orally administering to the disease-free animals a growth promoting amount of a feedstuff containing from about 0.0015 percent to about 0.03 percent 1-methyl-5-nitroimidazol-2-ylmethyl carbamate.

2. A method according to claim 1 wherein said feedstuff contains from about 0.003 percent to about 0.013 percent 1-methyl-5-nitroimidazol-2-ylmethyl carbamate.

3. A method for promoting the growth of disease-free poultry and swine which comprises orally administering to the disease-free animals a growth promoting amount of water containing from about 0.00075 percent to about 0.015 percent 1-methyl-5-nitroimidazol-2-ylmethyl carbamate.

4. A method according to claim 3 wherein said water contains from about 0.0015 percent to about 0.0065 percent 1-methyl-5-nitroimidazol-2-ylmethyl carbamate.

* * * * *